(12) United States Patent
Han

(10) Patent No.: US 10,332,600 B2
(45) Date of Patent: Jun. 25, 2019

(54) CHIP PROGRAMMING DEVICE AND PROTECTING METHOD THEREOF

(71) Applicants: INVENTEC (PUDONG) TECHNOLOGY CORPORATION, Shanghai (CN); INVENTEC CORPORATION, Taipei (TW)

(72) Inventor: Ying-Xian Han, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 15/870,469

(22) Filed: Jan. 12, 2018

(65) Prior Publication Data
US 2019/0051358 A1    Feb. 14, 2019

(30) Foreign Application Priority Data
Aug. 8, 2017    (CN) .......................... 2017 1 0709486

(51) Int. Cl.
| | |
|---|---|
| *G11C 5/06* | (2006.01) |
| *G11C 16/12* | (2006.01) |
| *G06F 13/16* | (2006.01) |
| *G06F 9/445* | (2018.01) |
| *G11C 16/04* | (2006.01) |
| *G11C 29/02* | (2006.01) |
| *H01L 27/24* | (2006.01) |
| *G11C 16/34* | (2006.01) |
| *G06F 21/73* | (2013.01) |
| *G11C 5/14* | (2006.01) |
| *G11C 16/10* | (2006.01) |

(Continued)

(52) U.S. Cl.
CPC .............. *G11C 16/12* (2013.01); *G06F 9/445* (2013.01); *G06F 13/16* (2013.01); *G06F 21/73* (2013.01); *G11C 5/14* (2013.01); *G11C 5/144* (2013.01); *G11C 7/24* (2013.01); *G11C 16/04* (2013.01); *G11C 16/102* (2013.01); *G11C 16/22* (2013.01); *G11C 16/225* (2013.01); *G11C 16/30* (2013.01); *G11C 16/3459* (2013.01); *G11C 29/023* (2013.01); *H01L 27/2436* (2013.01)

(58) Field of Classification Search
USPC ...................................... 365/63, 51
See application file for complete search history.

(56) References Cited

U.S. PATENT DOCUMENTS

2013/0173831 A1*    7/2013    Chen ................. G06F 9/4403
                                                          710/107

* cited by examiner

*Primary Examiner* — Son T Dinh
(74) *Attorney, Agent, or Firm* — Maschoff Brennan

(57) ABSTRACT

A chip programming device comprises a chip socket and a protecting circuit. The chip socket is configured to accommodate a chip to be programmed, is electrically connected with a circuit board, and comprises a power terminal and a ground terminal which are configured to connect to the chip. The protecting circuit is disposed on the circuit board, and comprises a power input terminal, an enable signal input terminal and a power output terminal which is electrically connected to the power terminal of the chip socket. The protecting circuit receives a power signal via the power input terminal, receives an enable signal via the enable signal input terminal, provides the power signal to the chip socket via the power output terminal when the enable signal has a first electric potential, and terminates the power signal to the chip socket when the enable signal has a second electric potential.

8 Claims, 6 Drawing Sheets

(51) Int. Cl.
  *G11C 16/22* (2006.01)
  *G11C 16/30* (2006.01)
  *G11C 7/24* (2006.01)

CHIP PROGRAMMING DEVICE AND PROTECTING METHOD THEREOF

CROSS-REFERENCE TO RELATED APPLICATIONS

This non-provisional application claims priority under 35 U.S.C. § 119(a) on Patent Application No(s). 201710709486.X filed in China on Aug. 8, 2017, the entire contents of which are hereby incorporated by reference.

BACKGROUND

Technical Field

This disclosure relates to a chip programming device, and more particularly to a chip programming device applied to a chip.

Related Art

For the entire server system, each of its primary controlling chip (e.g. central processing unit, CPU), input/output (I/O) controller and management chip (e.g. baseboard management controller, BMC) comprises serial peripheral interface (SPI) as a receiver. The SPI chip of each of the above components stores the corresponding firmware information. On the hardware side, there is a need to design a chip programming device with the offline programming function for writing the firmware information of each component into the chip.

However, the multiple pins of the chip are arranged symmetrically but there is neither mark indicating the upper end or the lower end of the chip nor method for determining the placement direction of the chip in the case of the conventional chip programming device. Therefore, when the chip is placed reversely in the chip programming device (e.g. placed upside down), the chip must be damaged due to short-circuit, which drastically reduces the operating efficiency of the system.

SUMMARY

According to an embodiment of this disclosure, a chip programming device comprises a chip socket and a protecting circuit. The chip socket is configured to accommodate a chip to be programmed, is electrically connected with a circuit board, and comprises a power terminal and a ground terminal, wherein the power terminal and the ground terminal are configured to connect to the chip. The protecting circuit is disposed on the circuit board, and comprises a power input terminal, an enable signal input terminal and a power output terminal, wherein the power output terminal is electrically connected to the power terminal of the chip socket. The protecting circuit receives a power signal via the power input terminal, receives an enable signal via the enable signal input terminal, provides the power signal to the power terminal of the chip socket via the power output terminal when the enable signal has a first electric potential, and terminates the power signal to the chip socket when the enable signal has a second electric potential.

According to another embodiment of this disclosure, wherein the protecting circuit of the chip programming device sets the enable signal to have the second electric potential when an electric potential of the power terminal of the chip socket is equal to or lower than a threshold electric potential.

According to yet another embodiment of this disclosure, the chip programming device further comprises an indicator connecting the power output terminal of the protecting circuit and the power terminal of the chip socket, and providing an alarm when the electric potential of the power terminal of the chip socket is equal to or lower than the threshold electric potential.

According to yet another embodiment of this disclosure, wherein the indicator of the chip programming device is a light emitting diode, and the alarm is indicated by stopping emitting light.

According to yet another embodiment of this disclosure, the chip programming device further comprises a programming controller electrically connected to the chip socket, configured to be connected to an external computer, to write subject data in the chip via the chip socket according to a writing command and the subject data provided by the external computer, or to read stored data from the chip via the chip socket according to a reading command provided by the external computer.

According to yet another embodiment of this disclosure, wherein the programming controller of the chip programming device is further electrically connected to the protecting circuit, provides a power to the power input terminal of the protecting circuit, and provides the enable signal to the enable signal input terminal of the protecting circuit.

According to yet another embodiment of this disclosure, wherein the chip socket of the chip programming device further comprises a power hole and a ground hole, the power hole is connected to the power terminal and configured to be connected to a pin of the chip, and the ground hole is connected to the ground terminal and configured to be connected to another pin of the chip.

According to yet another embodiment of this disclosure, wherein the chip socket of the chip programming device further comprises a chip selecting hole, a signal input hole, a signal output hole, a clock hole, a write protecting hole and a holding hole.

According to an embodiment of this disclosure, a protecting method of a chip programming device, with the chip programming device comprising a chip socket and a protecting circuit, with a power terminal of the chip socket connected to a power output terminal of the protecting circuit, comprises: controlling the power output terminal of the protecting circuit to provide a power signal to the chip socket or to terminate the power signal to the chip socket according to an enable signal inputted in the protecting circuit; wherein the power output terminal of the protecting circuit is controlled to provide the power signal to the chip socket when the enable signal has a first electric potential, and the power output terminal of the protecting circuit is controlled to terminate the power signal to the chip socket when the enable signal has a second electric potential.

According to another embodiment of this disclosure, the step of controlling the power output terminal of the protecting circuit to terminate the power signal of the protecting method of a chip programming device comprises: controlling the protecting circuit to set the enable signal to have the second electric potential when an electric potential of the power terminal of the chip socket is equal to or lower than a threshold electric potential.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 1 is a block function diagram of a chip programming device according to an embodiment of this disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
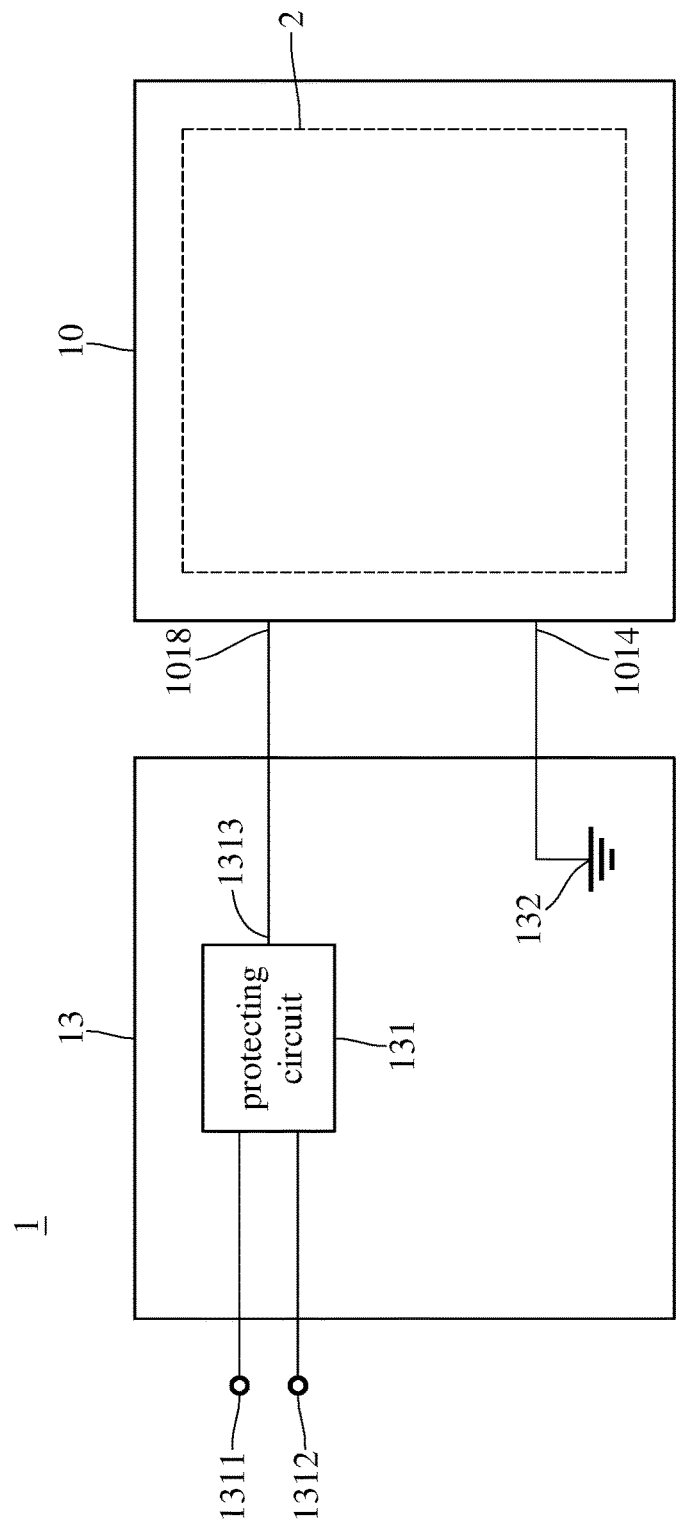

Please refer to FIG. 1 which is a block function diagram of a chip programming device according to an embodiment of this disclosure. As shown in FIG. 1, the chip programming device 1 comprises a chip socket 10 and a circuit board 13 which are connected to each other. The chip socket 10 is configured to accommodate a chip 2 to be programmed, and comprises a power terminal 1018 and a ground terminal 1014 wherein the power terminal 1018 and the ground terminal 1014 are configured to be electrically connected to the chip 2. More specifically, the chip socket 10 further comprises a power hole and a ground hole for connecting to the power terminal 1018 and the ground terminal 1014 respectively. When the chip 2 is placed in the chip socket 10, a pin of the chip 2 is connected to the power hole of the chip socket 10, and another pin of the chip 2 is connected to the ground hole of the chip socket 10.

There is a protecting circuit 131 disposed on the circuit board 13 of the chip programming device 1. The protecting circuit 131 comprises a power input terminal 1311, an enable signal input terminal 1312 and a power output terminal 1313. The power output terminal 1313 is electrically connected to the power terminal 1018 of the chip socket 10. In other words, the chip socket 10 is electrically connected to the protecting circuit 131 of the circuit board 13 via the power terminal 1018. Moreover, there is also a grounding pad 132 disposed on the circuit board 13, and the ground terminal 1014 of the chip socket 10 is electrically connected to the grounding pad 132.

In this embodiment, the protecting circuit 131 receives a power signal via the power input terminal 1311, receives an enable signal via the enable signal input terminal 1312, and selectively provides the power signal to the chip socket 10 via the power output terminal 1313 according to the electric potential of the enable signal. Specifically, the protecting circuit 131 provides the power signal to the power terminal 1018 of the chip socket 10 via the power output terminal 1313 when the enable signal has a first electric potential. In contrast, the protecting circuit 131 terminates the power signal to the chip socket 10 when the enable signal has a second electric potential. More specifically, the protecting circuit 131 sets the enable signal to have the second electric potential when the electric potential of the power terminal 1018 of the chip socket 10 is equal to or lower than a threshold electric potential. For example, the first electric potential indicates a high electric potential, the second electric potential indicates a low electric potential, and the threshold electric potential is preset to be zero.

In a practical case, when the chip 2 is placed in the reverse direction in the chip socket 10 (i.e. the power pin and the ground pin of the chip 2 are placed reversely so that the ground pin is connected to the power terminal 1018 of the chip socket 10), the circuit such as an electrostatic discharge (ESD) circuit in the chip 2 causes the decrease of the electric potential of the power terminal 1018. Therefore, when the electric potential of the power terminal 1018 is equal to or lower than the preset threshold electric potential (e.g. zero), the electric potential of the power output terminal 1313 of the protecting circuit 131 is also equal to or lower than the preset threshold electric potential so that the enable signal has the second electric potential; thereby, the protecting circuit 131 terminates the power signal to the chip socket 10.

Figure 2:
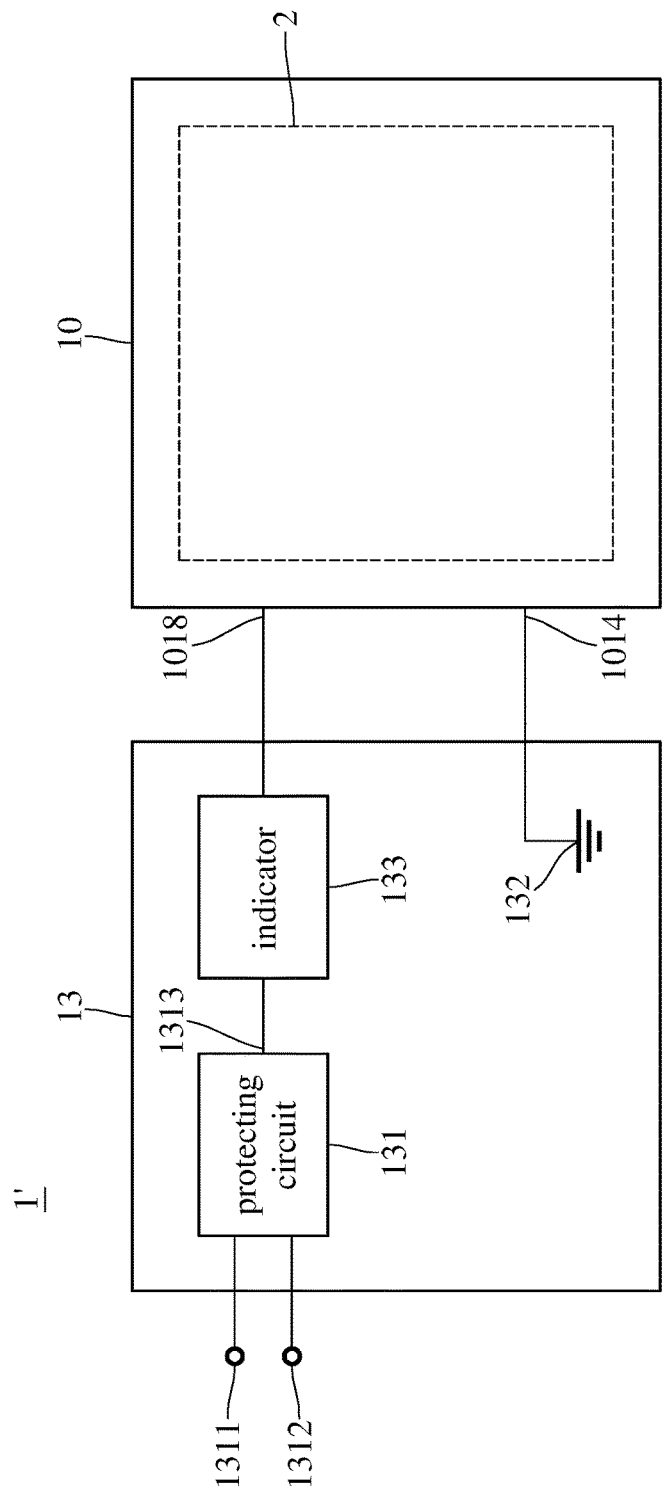
FIG. 2 is a block function diagram of another chip programming device according to an embodiment of this disclosure.

Please refer to FIG. 2 which is a block function diagram of another chip programming device according to an embodiment of this disclosure. The chip programming device 1' in FIG. 2, similar to the chip programming device 1 in FIG. 1, comprises a chip socket 10 and a circuit board 13' where a protecting circuit 131 is disposed. In comparison with the chip programming device 1 in FIG. 1, the chip programming device 1' further comprises an indicator 133 electrically connecting the power output terminal 1313 of the protecting circuit 131 and the power terminal 1018 of the chip socket 10. The connection relation between the chip socket 10 and the protecting circuit 131 in this embodiment is similar to that in the embodiment of FIG. 1, so that the related details are not repeated.

The indicator 133 provides an alarm when the electric potential of the power terminal 1018 of the chip socket 10 is equal to or lower than a threshold electric potential. In other words, when the chip is placed in an incorrect direction in the chip socket 10 (e.g. the power pin of the chip 2 is connected to the ground hole of the chip socket 10 and the ground pin of the chip 2 is connected to the power hole of the chip socket 10), the electric potential of power terminal 1018 of the chip socket 10 drops below the threshold electric potential, so that the indicator 133 generates an alarm to warn the user of the incorrect placement of the chip 2. For example, the indicator 133 is a light emitting diode (LED). When the electric potential of the power terminal 1018 of the chip socket 10 is equal to the electric potential of the power signal from the circuit board 13', the LED emits the light for indicating that the power supplied for the chip 2 by the chip socket 10 is normal (i.e. the chip 2 is placed correctly). In contrast, when the electric potential of the power terminal 1018 of the chip socket 10 is equal to or lower than the threshold electric potential, the LED stops emitting the light for indicating that the power supplied for the chip 2 by the chip socket 10 is abnormal (i.e. the chip 2 is placed incorrectly). Therefore, the user can confirm whether the chip 2 is correctly placed in the chip socket 10 through the indicator 133.

Figure 3:
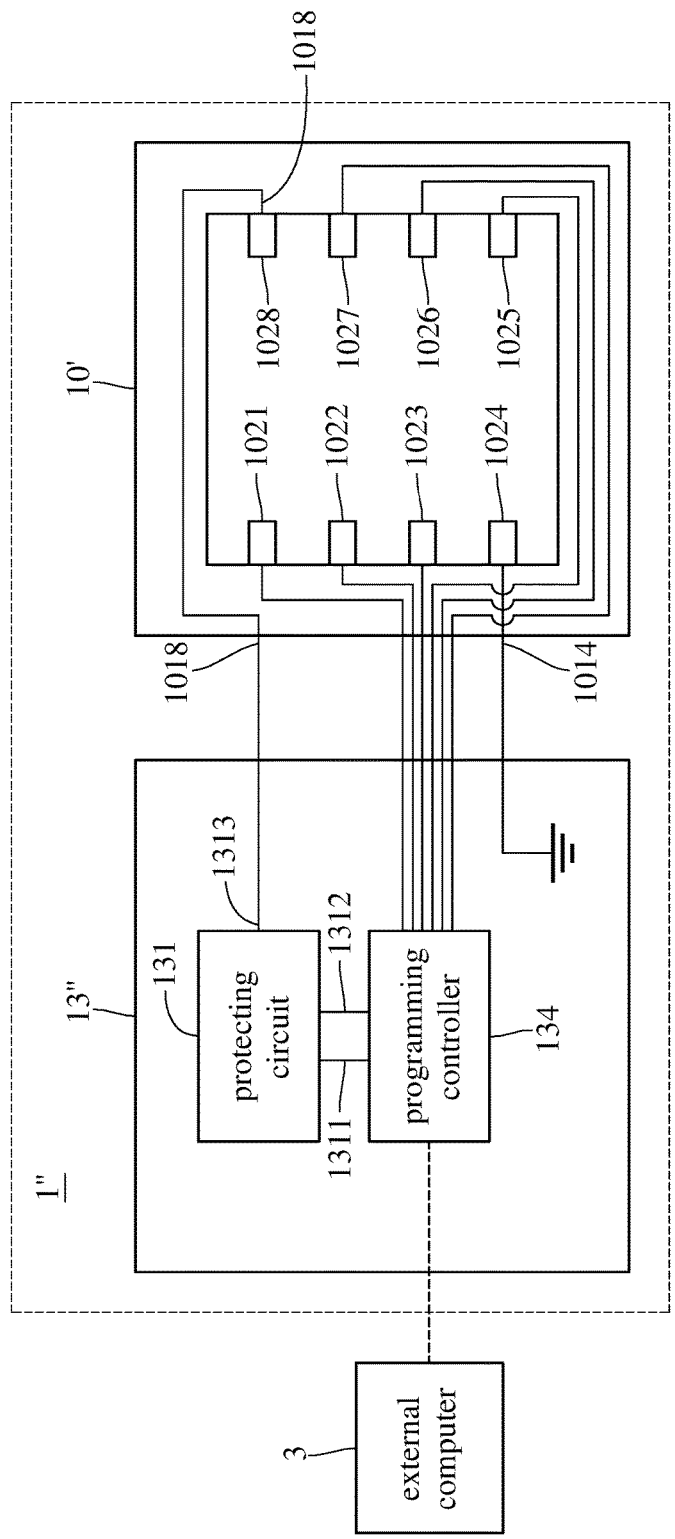
FIG. 3 is a block function diagram of yet another chip programming device according to an embodiment of this disclosure.

Please refer to FIG. 3 which is a block function diagram of yet another chip programming device according to an embodiment of this disclosure. As shown in FIG. 3, the chip programming device 1" comprises a chip socket 10' and a circuit board 13" where a protecting circuit 131 is disposed.

In this embodiment, besides the power hole 1028 corresponding to the power terminal 1018 and the ground hole 1024 corresponding to the ground terminal 1014, the chip socket 10' further comprises a chip selecting (CS) hole 1021, a signal output (SO) hole 1022, a write protecting (WP) hole 1023, a signal input (SI) hole 1025, a clock (CLK) hole 1026, and a holding hole 1027. These holes are respectively connected to the pins of the chip when the chip is placed in the chip socket 10', and have different functions respectively. The CS hole 1021 is configured to receive a chip select signal for selecting one chip; the SO hole 1022 is configured to read the data stored in the chip; the WP hole 1023 is configured to control the state of the chip, and particularly, when the electric potential of the WP hole 1023 is adjusted to be the same as the working voltage of the chip, the chip programming device 1" performs writing the data in the chip or reading the data from the chip; the SI hole 1025 is configured to write the data in the chip; the CLK hole 1026 is configured to provide a clock signal; and the holding hole 1027 is configured to keep the chip being the high electric potential state.

In this embodiment, the chip programming device 1" further comprises a programming controller 134 disposed on the circuit board 13" and electrically connected to the chip socket 10'. The programming controller 134 is configured to have a communication connection or an electrical connection with an external computer 3, and to write subject data in the chip via the chip socket 10' according to a writing command and the subject data provided by the external computer 3. More particularly, the programming controller 134 can be electrically connected to the SI hole 1025 of the chip socket 10'. When the programming controller 134 receives the write command and the subject data to be written, the programming controller 134 writes the data in the chip via the SI hole 1025.

The programming controller 134 can also read the stored data from the chip via the chip socket 10' according to the reading command provided by the external computer 3. More particularly, the programming controller 134 can be connected to the SO hole 1022 of the chip socket 10'. The programming controller 134 reads the chip via the SO hole 1022 when receiving the reading command from the external computer 3. Therefore, a user can input the writing command or reading command into the external computer 3 so as to control the chip programming device 1" to write the data into the chip or to read the data stored in the chip.

Moreover, the programming controller 134 can further be electrically connected to the CS hole 1021, the WP hole 1023, the CLK hole 1026 and the holding hole 102 of the chip socket 10' for controlling these hole to perform the aforementioned functions. In addition, the programming controller 134 can further be electrically connected to the power input terminal 1311 and the enable signal input terminal 1312 of the protecting circuit 131 for respectively providing the power and enable signals to the protecting circuit 131. The programming controller 134 sends the power and enable signals to the protecting circuit 131 when receiving the writing command, the reading command or other commands from the external computer 3, and the protecting circuit 131 determines whether the chip is place correctly in the chip socket so as to perform or not to perform writing, reading or other operation.

Figure 4:
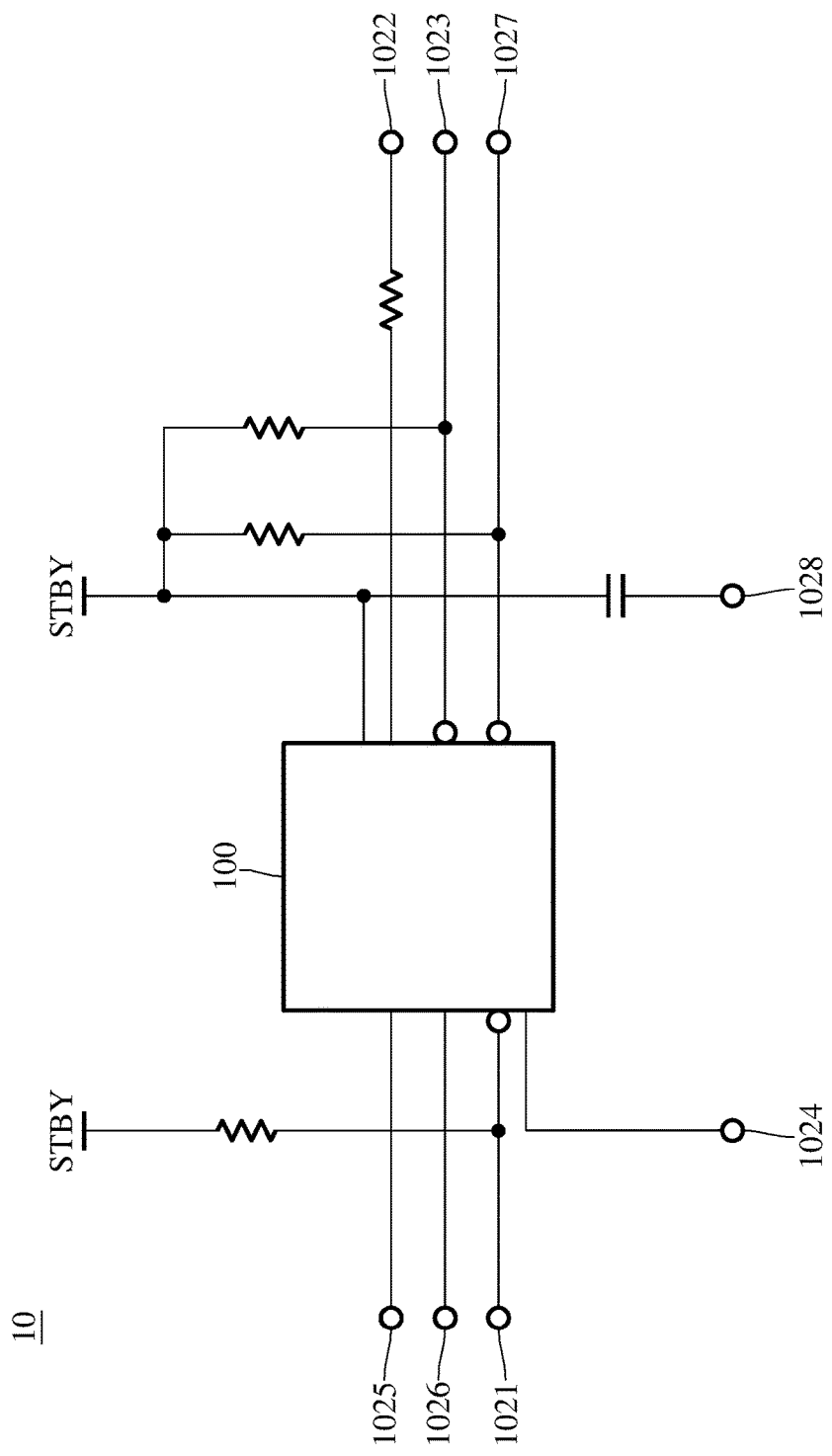
FIG. 4 is a circuit diagram of a chip socket according to an embodiment of this disclosure.
Figure 5:
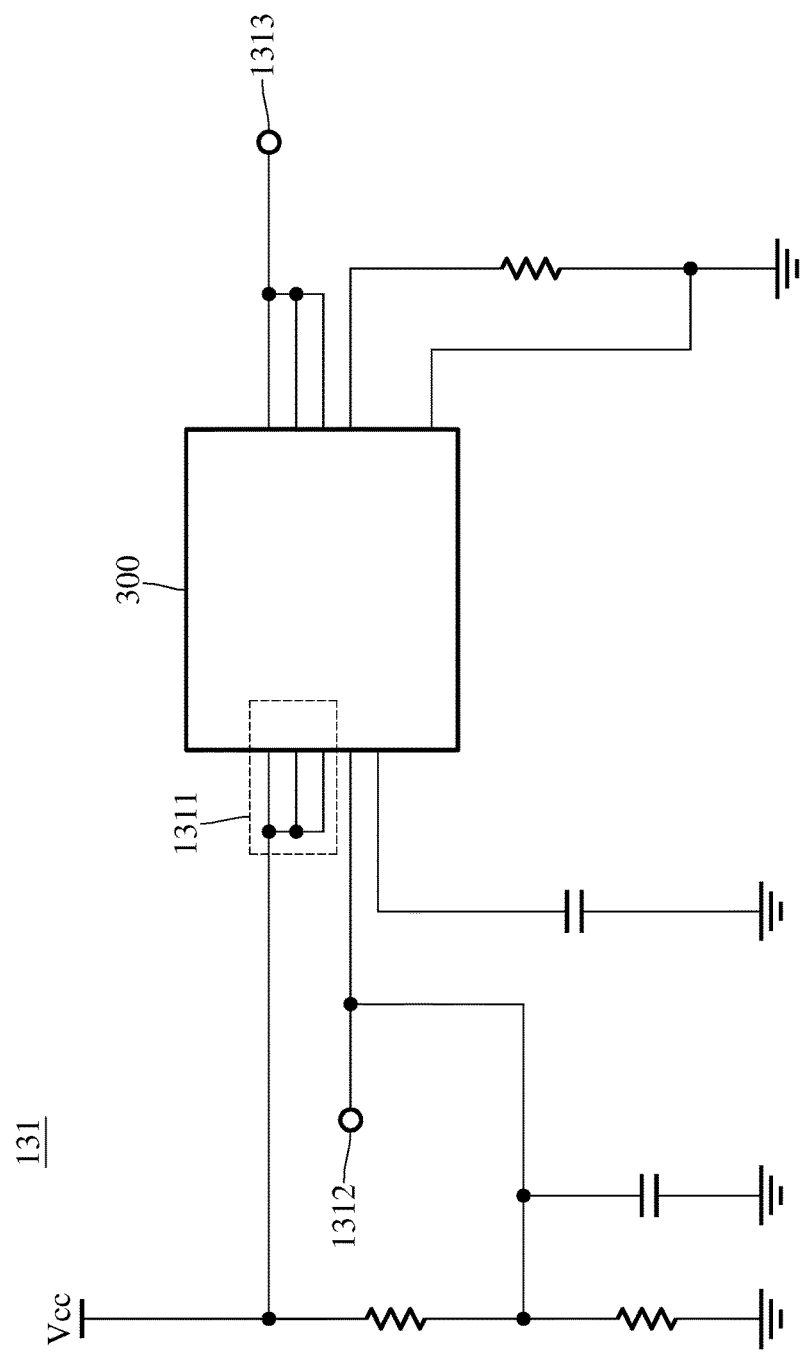
FIG. 5 is a circuit diagram of a protecting circuit according to an embodiment of this disclosure.

Please refer to FIG. 4 and FIG. 5, wherein FIG. 4 illustrates the circuit diagram of the chip socket 10 or 10' applied to the above embodiments, and FIG. 5 illustrates the circuit diagram of the protecting circuit 131 according to the above embodiments. For example, the component 100 in FIG. 4 is a flash read-only memory (Flash ROM), and the component 300 in FIG. 5 is an eFuse.

Figure 6:
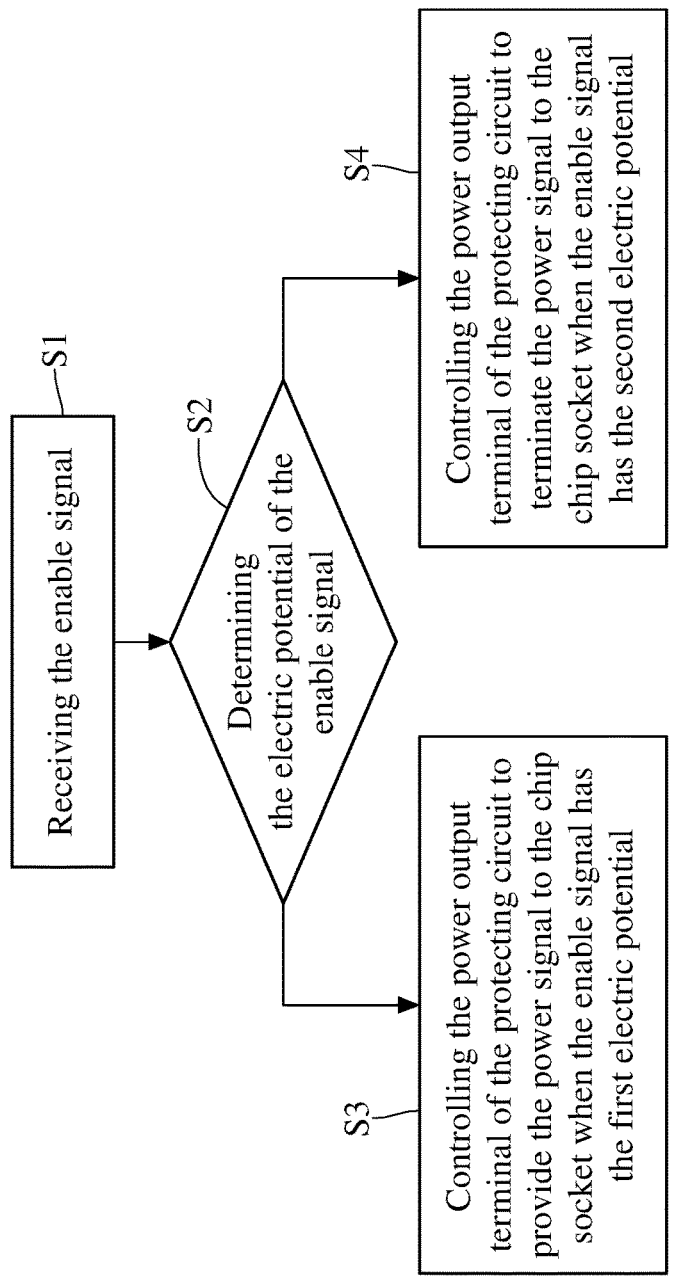
FIG. 6 is a flow chart of the protecting method of a chip programming device according to an embodiment of this disclosure.

Please refer to FIG. 1 and FIG. 6, wherein FIG. 6 is a flow chart of the protecting method of a chip programming device according to an embodiment of this disclosure. In this embodiment, the protecting circuit 131 of the chip programming device 1 controls its power output terminal 1313 to provide a power signal to the chip socket 10 or to terminate the power signal to the chip socket 10 according to an enable signal. More particularly, as described in steps S1 and S2 in FIG. 6, the protecting circuit 131 receives the enable signal, and determines the electric potential of the enable signal. In step S3, when the enable signal has a first electric potential, the protecting circuit 131 controls its power output terminal 1313 to provide the power signal to the chip socket 10. In step S4, when the enable signal has a second electric potential, the protecting circuit 131 controls its power output terminal 1313 to terminate the power signal to the chip socket 10.

In practice, when the chip 2 is placed in an incorrect direction in the chip socket 10 (e.g. the chip 2 is placed upside down so that its ground pin is connected to the power terminal 1018 of the chip socket 10), the disposition of the ESD circuit in the chip 2 causes the decrease of the electric potential of the power terminal 1011 of the chip socket 10, and simultaneously causes the decrease of the electric potential of the power output terminal 1313 of the protecting circuit 131. Therefore, when the electric potential of the power terminal 1011 of the chip socket 10 is equal to or lower than the threshold electric potential, the protecting circuit 131 sets the enable signal to have the second electric potential so as to terminate the power signal to the incorrectly placed chip 2.

In view of the above description, the chip programming device and the protecting method thereof provided in this disclosure determines the correctness of the placement of the chip in the chip socket by the protecting circuit, and thereby provides or terminates the power signal to the chip socket. Therefore, it may avoid the chip from the damage resulted from the situation that the chip programming device continues providing the power signal to the chip socket when the chip is placed incorrectly in the chip socket.

What is claimed is:
1. A chip programming device, comprising:
   a chip socket, configured to accommodate a chip to be programmed, electrically connected to a circuit board, and comprising a power terminal and a ground terminal, with the power terminal and the ground terminal configured to connect to the chip; and
   a protecting circuit, disposed on the circuit board, and comprising a power input terminal, an enable signal input terminal and a power output terminal, with the power output terminal electrically connected to the power terminal of the chip socket, and the protecting circuit receiving a power signal via the power input terminal, receiving an enable signal via the enable signal input terminal, providing the power signal to the power terminal of the chip socket via the power output terminal when the enable signal has a first electric potential, and terminating the power signal to the chip socket when the enable signal has a second electric potential,
   wherein the protecting circuit sets the enable signal to have the second electric potential when an electric potential of the power terminal of the chip socket is equal to or lower than a threshold electric potential.

2. The chip programming device according to claim 1, further comprising an indicator connecting the power output terminal of the protecting circuit and the power terminal of the chip socket, and providing an alarm when the electric potential of the power terminal of the chip socket is equal to or lower than the threshold electric potential.

3. The chip programming device according to claim 2, wherein the indicator is a light emitting diode, and the alarm is indicated by stopping emitting light.

4. The chip programming device according to claim 1, further comprising a programming controller electrically connected to the chip socket, configured to be connected to an external computer, to write subject data in the chip via the chip socket according to a writing command and the subject data provided by the external computer, or to read stored data from the chip via the chip socket according to a reading command provided by the external computer.

5. The chip programming device according to claim 4, wherein the programming controller is further electrically connected to the protecting circuit, provides a power to the power input terminal of the protecting circuit, and provides the enable signal to the enable signal input terminal of the protecting circuit.

6. The chip programming device according to claim 1, wherein the chip socket further comprises a power hole and a ground hole, the power hole is connected to the power terminal and configured to be connected to a pin of the chip, and the ground hole is connected to the ground terminal and configured to be connected to another pin of the chip.

7. The chip programming device according to claim 6, wherein the chip socket further comprises a chip selecting hole, a signal input hole, a signal output hole, a clock hole, a write protecting hole and a holding hole.

8. A protecting method of a chip programming device, with the chip programming device comprising a chip socket and a protecting circuit, with a power terminal of the chip socket connected to a power output terminal of the protecting circuit, and the protecting method comprising:
controlling the power output terminal of the protecting circuit to provide a power signal to the chip socket or to terminate the power signal to the chip socket according to an enable signal inputted in the protecting circuit;
wherein the power output terminal of the protecting circuit is controlled to provide the power signal to the chip socket when the enable signal has a first electric potential, and the power output terminal of the protecting circuit is controlled to terminate the power signal to the chip socket when the enable signal has a second electric potential,
wherein controlling the power output terminal of the protecting circuit to terminate the power signal comprises:
controlling the protecting circuit to set the enable signal to have the second electric potential when an electric potential of the power terminal of the chip socket is equal to or lower than a threshold electric potential.

* * * * *